United States Patent
Kipnis

(10) Patent No.: US 10,787,939 B1
(45) Date of Patent: Sep. 29, 2020

(54) POPPET VALVE FOR INTERNAL COMBUSTION ENGINE

(71) Applicant: Cyclazoom, LLC, Evanston, IL (US)

(72) Inventor: Michael Kipnis, Skokie, IL (US)

(73) Assignee: Cyclazoom, LLC, Evanston, IL (US)

( * ) Notice: Subject to any disclaimer, the term of this patent is extended or adjusted under 35 U.S.C. 154(b) by 0 days.

(21) Appl. No.: 16/539,098

(22) Filed: Aug. 13, 2019

Related U.S. Application Data

(60) Provisional application No. 62/827,446, filed on Apr. 1, 2019.

(51) Int. Cl.
*F01L 3/20* (2006.01)
*B23P 15/00* (2006.01)
*B21K 1/22* (2006.01)

(52) U.S. Cl.
CPC ........ *F01L 3/20* (2013.01); *B21K 1/22* (2013.01); *B23P 15/002* (2013.01)

(58) Field of Classification Search
CPC ........................................................ F01L 3/20
USPC ..................................................... 123/188.3
See application file for complete search history.

(56) References Cited

U.S. PATENT DOCUMENTS

| | | | |
|---|---|---|---|
| 821,758 A | 5/1906 | Smith | |
| 1,539,167 A | 5/1925 | Diel et al. | |
| 1,969,202 A | 8/1934 | Bugaud | |
| 3,757,757 A | 9/1973 | Bastenhof | |
| 3,861,376 A | 1/1975 | Ashley | |
| 3,871,339 A * | 3/1975 | Kuhn | F01L 3/18 123/41.41 |
| 4,424,777 A | 1/1984 | Klomp | |
| 4,428,336 A | 1/1984 | Dye et al. | |
| 4,744,340 A | 5/1988 | Kirby | |
| 4,976,248 A | 12/1990 | Rowe | |
| 4,981,118 A | 1/1991 | Lefebvre | |
| 5,099,808 A | 3/1992 | Matsuura et al. | |
| 5,168,843 A | 12/1992 | Franks | |
| 5,301,640 A | 4/1994 | Barranco, Jr. | |
| 5,485,815 A | 1/1996 | Shida | |
| 5,619,796 A | 4/1997 | Larson et al. | |
| 5,771,852 A | 6/1998 | Heimann, Jr. et al. | |
| 6,679,478 B2 | 1/2004 | Murayama | |
| 7,182,056 B1 | 2/2007 | Czysz | |
| 7,377,249 B1 | 5/2008 | Dingle | |
| 8,230,834 B2 | 7/2012 | Endo | |
| 9,995,187 B2 | 12/2018 | Davis | |
| 2006/0180115 A1 | 8/2006 | Rubert | |
| 2007/0266984 A1 * | 11/2007 | Reinhardt | F01L 3/20 123/190.14 |

(Continued)

OTHER PUBLICATIONS

International Search Report for PCT/US20/26125 dated Jun. 30, 2020.
Written Opinion for PCT/US20/26125 dated Jun. 30, 2020.

*Primary Examiner* — Joseph J Dallo
*Assistant Examiner* — Yi-Kai Wang
(74) *Attorney, Agent, or Firm* — Brian Roffe

(57) ABSTRACT

Poppet valve for an internal combustion engine including a valve stem and a single circular valve head attached at one end of the valve stem. The valve head has a circular peripheral contour and an arcuate edge without any sharp elements to avoid turbulence and improve flow around the valve to therefore maximize flow velocity. This translates into increased cylinder breathing in the intake cycle and reducing back pressure in the exhaust cycle.

20 Claims, 3 Drawing Sheets

(56) References Cited

U.S. PATENT DOCUMENTS

| | | | |
|---|---|---|---|
| 2009/0095247 A1* | 4/2009 | Cheng | F01L 3/24 |
| | | | 123/188.9 |
| 2009/0266314 A1 | 10/2009 | Uchiyama et al. | |
| 2013/0333667 A1* | 12/2013 | Ishida | F02M 21/042 |
| | | | 123/445 |
| 2016/0348546 A1 | 12/2016 | Kurahashi et al. | |
| 2017/0211433 A1* | 7/2017 | Davis | F01L 3/12 |
| 2017/0276032 A1* | 9/2017 | Murakami | F01L 3/02 |

\* cited by examiner

US 10,787,939 B1

POPPET VALVE FOR INTERNAL COMBUSTION ENGINE

FIELD OF THE INVENTION

This invention relates generally to internal combustion engines, and more specifically to poppet valves for such.

BACKGROUND OF THE INVENTION

Internal combustion engines use a variety of types of valves to control the intake and exhaust of gases as the engines operate. Most internal combustion engines are of the four-stroke variety, and most four-stroke engines use poppet valves. Such an engine includes a head which forms the upper surface of the combustion chamber. The intake and exhaust valves open and close to permit or restrict gas flow through their respective intake and exhaust openings in the head. It is generally recognized as highly desirable to improve the engine's ability to "breathe". An engine is essentially a gas pump which pumps in air-fuel mixture and pumps out waste gas or exhaust. Because the exhaust gas is typically under significantly greater pressure than the air-fuel mixture, most engine designs use intake valves which are larger than their exhaust valves. However, smaller exhaust valves create more back pressure on a piston.

A typical prior art poppet valve includes an elongated, cylindrical stem coupled to (and typically integrally formed with) a poppet. The poppet is sometimes referred to as the disc of the valve. The poppet is typically adapted with a seating face which is angled to mate with a corresponding surface in the head (not shown) known as the valve seat. The widest part of the poppet limits the size of the valve and the lift, as the valve must not be permitted to strike or interfere with any other engine component.

Modern four-stroke engines use overhead camshafts to open their valves, and valve springs to return the valves to their closed position. In most instances, the valves and their actuating hardware such as shims, buckets, cam followers, and so forth, are designed to permit—and in many cases encourage—the valves to gradually rotate within their valve seats. This improves the evenness of valve wear, and helps prevent loss of compression due to localized carbon buildup and the like. Therefore, valves are constructed as an axisymmetric revolve, meaning that they are symmetrical about the axis of their shaft. This symmetry also improves manufacturability and lowers manufacturing cost.

However, a conventional poppet valve which is used in a four-stroke engine has sharp edges which makes the flow around the poppet valve not smooth and for high velocity flow, the lack of smoothness causes turbulence and shock waves and therefore restricts flow. This translates into lower engine-fuel efficiency.

Prior art of interest to the field of the invention includes:

U.S. Pat. No. 4,981,118 (Lefebvre) which describes an internal combustion engine having one or more cylinder assemblies containing pistons, for driving the pistons by an air-fuel mixture introduced into the one or more cylinder assemblies through one or more pairs of valve apertures for combustion and for expelling the combusted air fuel mixture from the cylinder assembly through the pairs of valve apertures. Each pair of valve apertures has a movable poppet valve defining a head and at least two stems endwisely attached to the head spacedly parallel to each other. At least one pair of valve apertures and at least one poppet valve head has a non-circular peripheral contour. Valve stem guide means, one for each valve stem, guide displacement thereof exactly axially thereof. Each valve is positively prevented from rotating at all time. Upon the valve head thereof closing the corresponding valve port aperture, the valve head thereof positively seals at all time this valve port aperture.

U.S. Pat. No. 5,168,843 (Franks) describes a poppet valve having a valve body including first and second opposed faces and an internal port extending therebetween. A superior portion for positioning the valve body is connected to the first face, which includes first and second annular sealing surfaces. The first sealing surface is coaxial with the second sealing surface and tapers toward the superior portion. The second sealing surface surrounds an opening of the internal port and tapers toward the second face. A cylinder head design for an internal combustion engine is likewise disclosed which provides annular seats with which the first and second sealing surfaces cooperate to selectively open or close the valve.

U.S. Pat. No. 5,301,640 (Barranco, Jr.) describes an engine valve including a valve stem having a valve head fixedly and orthogonally mounted to the valve stem. The valve head includes a valve head bottom wall and a valve head helical top wall, the top wall being arranged concentrically about the valve stem. The valve head further includes a conical side wall portion, with the top wall including a top wall first end in contiguous communication with the conical side wall portion, and a top wall second end radially directed and in intersection with the valve stem, with the top wall second end arranged in a spaced relationship relative to the conical side wall portion.

U.S. Pat. No. 5,771,852 (Heimann, Jr. et al.) describes a poppet valve having a disk-shaped head, an elongated stem and a tapered neck between the head and the stem. The neck has an outer surface with an undulating circumferential contour. The undulating circumferential contour at the neck is defined by an embossed hollow wall portion of the valve and a plurality of grooves at the outer surface of the neck. Alternatively, the undulating circumferential contour is defined by a plurality of ribs at the outer surface of the neck. In each case, the undulating circumferential contour improves component strength and heat transfer efficiency. The undulating circumferential contour may also influence valve rotation and inlet charge swirl.

U.S. Pat. No. 6,679,478 (Murayama) describes a hollow poppet valve having a fillet area opened like a flare, which is formed at one end of a cylindrical stem portion, and a cap integrated by welding at the opened edge portion of the fillet area, is provided such that the opened edge portion of the fillet area is formed to be thicker than the other areas, and a face is formed at the thicker portion. The open edge portion at which a cap is welded is thicker than the other areas to reduce the influence of the heat of welding on the face. By making the open edge portion of the fillet area thicker, adverse metallurgical influences due to welding heat on the face can be evaded, whereby the face can be maintained at a desired hardness. By making the other areas of the valve which are not significantly influenced by the heat of welding thinner, the total weight of the valve can be reduced.

U.S. Pat. No. 7,182,056 (Czysz) describes a poppet valve for use in an internal combustion engine. The poppet has a partially-inverted perimeter shape which substantially maintains the curtain area of the valve, and enables the valves to be packed more efficiently into the combustion chamber roof area than conventional, circular-perimeter poppet valves. For the same size combustion chamber, significantly greater total curtain area is thus achieved, improving engine performance. Valve weight is greatly reduced, enabling the use of lighter return springs, camshafts, desmodromic actuators, and so forth.

U.S. Pat. No. 8,230,834 (Endo) describes a hollow poppet valve having a stem portion provided at one end thereof with a tip portion, a cap portion, and a flared fillet portion formed between the stem portion and the cap portion. At least part of the stem portion that connects to the fillet portion is a thin hollow cylindrical member, and the cap member is welded to the fillet portion. The cap member is thin and has an arcuate axial cross section. It is laser-beam welded to the seat-abutment portion formed at the open end of the fillet portion such that a weld bead is formed along the inner periphery of the interface of the mated ends of the members. The weld bead adds an extra weld depth to the weld, which increases the modulus of section of the welded regions of the cap member and the fillet portion and enhances their welding strength.

U.S. Pat. Appln. Publ. No. 20090266314 (Uchiyama et al.) describes a coolant-containing hollow poppet valve which, in use, in consideration of a temperature distribution caused in each part of the valve, causes a lowering in fatigue strength and creep strength in the valve at its site exposed to high temperatures falling within the tolerance of design standard, and, in consideration of required properties at the other valve sites, holds abrasion resistance and strength, and a process for producing the same. An improvement in heat resistance, abrasion resistance and strength depending upon properties required in each site is realized by conducting a cold drawing step and an intermediate annealing step to bring the Vickers hardnesses of a cylindrical shaft portion and a fillet-shaped head portion open in a flare form to the other end of the shaft portion to approximately not less than 250 Hv and not more than 350 Hv, and approximately not less than 350 Hv, respectively, and conducting cold pressing to bring the Vickers hardness of a seat portion in the outer periphery of the opening to not less than 380 Hv.

U.S. Pat. Appln. Publ. No. 20160348546 (Kurahashi et al.) describes a poppet valve including a head portion formed integrally with one end side of a stem portion, wherein, on the head portion, a heat insulating portion that is positioned on a combustion chamber side and a metal layer that is positioned on a stem portion side and insulates radiation heat are formed. A hollow portion extending along a head surface is formed in the head portion, a metal layer that insulates radiation heat is formed on a upper end surface of the hollow portion, and a heat insulating portion is formed between the metal layer and a bottom surface of the hollow portion. Also, a metal layer that insulates radiation heat is formed on a bottom surface of the head portion, and a heat-insulating surface treatment layer is formed on a combustion chamber side of the metal layer that insulates radiation heat.

SUMMARY OF THE INVENTION

An internal combustion piston engine includes a cylinder head and a poppet valve movably arranged in said cylinder head and having a stem, a valve head having upper and lower surfaces and a peripheral edge section between the upper and lower surfaces. The peripheral edge section contains an arcuate contact surface without any straight edges between the upper surface of the valve head and the lower surface of the valve head. The valve head does not include sharp elements, e.g., an element formed between two straight or flat portions that has an obtuse angle.

In one embodiment, the cylinder head has a valve seat that has an arcuate contact surface that matches the arcuate contact surface of the peripheral edge section. The valve seat also does not include sharp elements.

The cylinder head may include a duct that does not have sharp edges thereby providing a smooth operative flow of fluid through the duct.

DESCRIPTION OF THE DRAWINGS

The invention, together with further advantages thereof, may best be understood by reference to the following description taken in conjunction with the accompanying drawings, wherein like reference numerals identify like elements, and wherein.

DETAILED DESCRIPTION OF THE INVENTION

The present invention relates to an improved internal combustion engine having a cylinder head and intake and exhaust poppet valves. The poppet valves have an arcuate edge without sharp elements.

Figure 1:
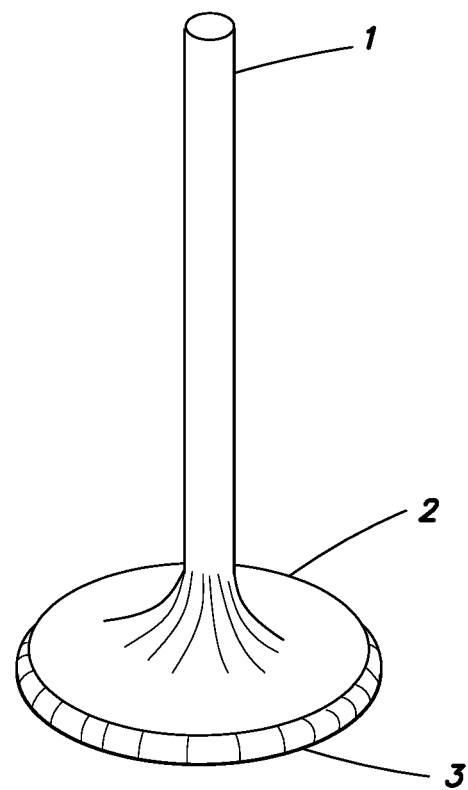
FIG. 1 is a perspective view of a poppet valve in accordance with the invention having an arcuate edge without sharp elements.

Referring to the accompanying drawings wherein like reference numbers refer to the same or similar elements. FIG. 1 shows a poppet valve in accordance with the invention including an elongate valve stem 1 of the poppet valve permanently attached at one end to a valve head 2 which has an arcuate edge or contact surface 3 and no sharp elements. The permanent attachment between the valve head 2 and the valve stem 1 may be the result of unitary formation of the valve stem 1 and valve head 2 or manner of attached resulting in a permanent fixation, e.g., welding. The arcuate edge 3 extends around the entire circumference of the valve head 2.

Although a permanent attachment, and preferably unitary formation, of the valve head 2 and the valve stem 2 are desired, separate formation and then permanent attachment is also envisioned as a possible embodiment of the invention, along with separate formation and then non-permanent attachment as yet another embodiment of the invention.

It is important to define the arcuate edge 3 of the valve head 2, which is a main aspect of novelty of the invention. As mentioned earlier, this edge 3 does not include sharp elements. That means that it preferably does not include any straight (flat) parts but is curved entirely from the upper surface of the valve head 2 to the lower surface of the valve head 2. Considering this aspect with reference to the slope, the slope of the arcuate edge 3 from the upper surface of the valve head 2 (starting at zero if the upper surface is planar and parallel to a horizontal axis) is negative, continuously increasing in magnitude (sign is still negative) until it reaches an infinite slope at the inflection point and then is positive at a maximum and continuously decreasing until it reaches the lower surface of the valve head 2 (returned to a zero slope if the lower surface is planar and parallel to the horizontal axis). By eliminating an obtuse angle between any two surface edge portions, sharp deflections of flow of gas are avoided, which reduces turbulence. Such obtuse angles are common in prior art poppet valves disclosed in the above-identified prior art.

The embodiment shown in FIG. 1 and the other figures is schematic only and does not represent a limitation on the number of possible configurations. Indeed, in some designs, the arcuate edges could be oriented in the opposite direction from that shown. The arcuate edge may be a smooth arcuate edge having the same curvature all around the circumference of the valve stem 1. Alternatively, the arcuate edge may have different shapes at different locations along the circumference of the valve stem 1.

Details of the embodiment of the invention will vary according to the specific engine design and characteristics. Conventional engine materials and technologies used to produce existing poppet valves and cylinder heads having valve seat can be used to provide the poppet valves and corresponding valve seats in accordance with the invention.

Figure 2:
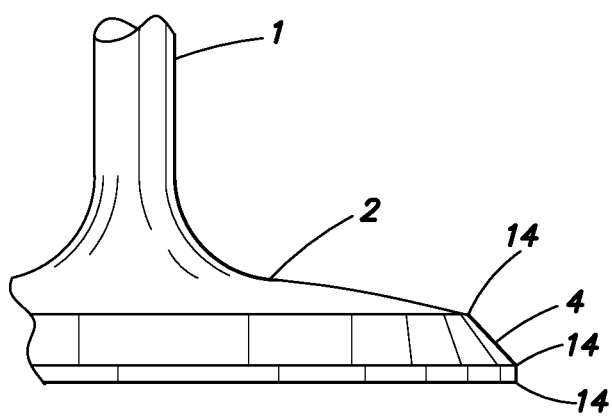
FIG. 2 is a perspective view of a conventional poppet valve with sharp edges and matching shape of a valve seat with sharp edges.
Figure 3:
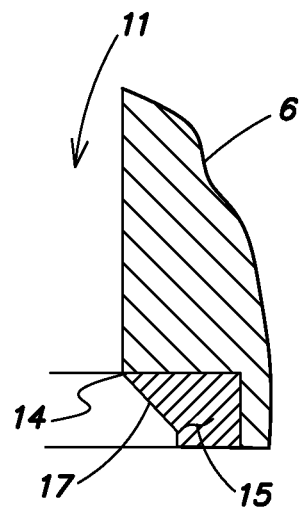
FIG. 3 is a cross-sectional view of a matching shape of a valve seat with sharp edges for the poppet valve shown in FIG. 2.

As shown in FIGS. 2 and 3, a conventional poppet valve has a valve stem similar to valve stem 1 and which is also permanently attached to a valve head similar to valve head 2 in one embodiment. The valve head has a peripheral conical edge section/contact surface 4. This conical edge part has a planar surface that meets other planar surfaces or curved surfaces. As such, the edge section 4 typically has sharp edges 14, e.g., it is a straight edge like a truncated conical section at the intersection of the planar portion and another planar or curved portion. A matching valve seat 15 provided in conjunction with the cylinder head 6 has a conical matching surface 17, matching to the edge section/contact surface 4, and sharp edges (see the cross-sectional area 11). Surface 17 is also straight.

As is fairly common in conventional engines, there are two sets of valves in an engine: intake valves that open to let the fuel-air mixture into the cylinder and exhaust valves that open to expel the combustion fumes. In both the intake and exhaust valves, the sharp edges 14 on the prior art valve head and the sharp edges on the matching valve seat 15 create turbulence, and shock waves that restrict the flow and reduce the speed of the gases flowing between the valve head and the valve seat 15 (into or out of the combustion chamber 7).

In the initial cycle, the sharp edges result in reduced filling of the combustion chamber 7 in the engine, and in the exhaust cycle, the sharp edges result in increasing back pressure on the piston. Both of these factors cause a reduction in the efficiency of the engine and increase pollution as well.

Figure 4:
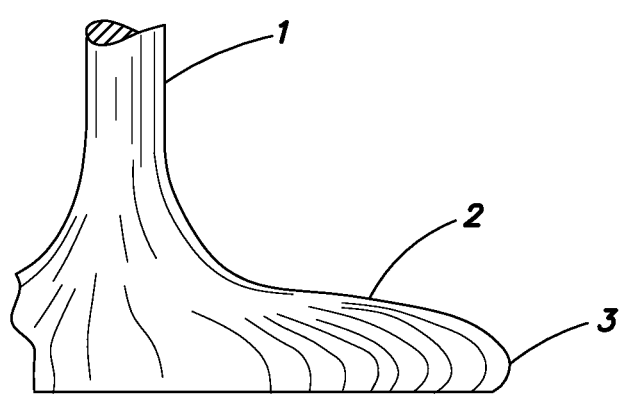
FIG. 4 is a perspective view of a poppet valve in accordance with the invention having an arcuate edge without sharp elements.
Figure 5:
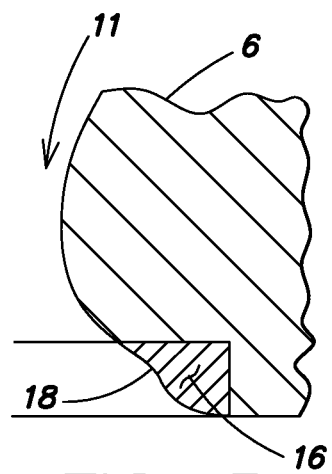
FIG. 5 is a cross-sectional view of a matching shape of a valve seat without sharp elements, and having a duct without sharp elements for the poppet valve shown in FIG. 4.

With a view to attaining higher engine performance, a poppet valve in accordance with the invention is shown in FIGS. 4 and 5 and has a valve head 2 which has an arcuate edge 3 without any sharp elements or edges. One way to view the edge 3 is as a convex surface that projects outward. A matching valve seat 16 has similar matching surface 18 without sharp elements or edges. The valve seat 16 would thus have a concave edge. Another way to consider the arcuate edge 3 of the valve head 2 is as a surface lacking a discernible planar portion, i.e., the surface is entirely curved.

Figure 6:
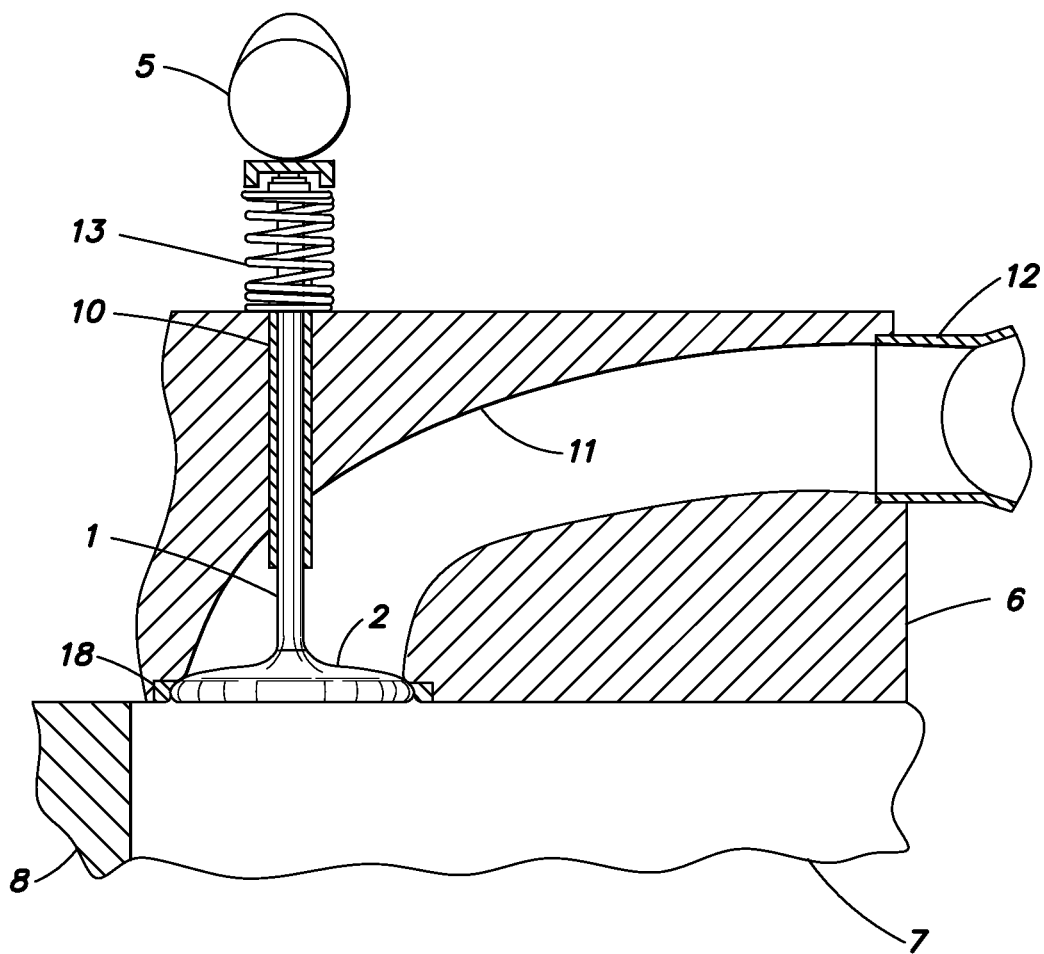
FIG. 6 is a partial cross-sectional view of a four-stroke engine having a cylinder head with a poppet valve.

As shown in FIGS. 4-6, the cylinder head 6 continues the curvature of the valve seat matching surface 18. This provides for a smooth flow in the duct 11 which in turn provides for, in the intake cycles, an increase in the filling of air-fuel mixture into the cylinder. This in turn results in greater engine power and efficiency. In the exhaust cycle, the smooth flow allows for faster and easier removal of combustion products, reducing back pressure on the piston, and which also translates into more removal of combustion products improving the burning process and higher efficiency and pollution reduction.

FIG. 6 also shows additional features of the engine, including a camshaft 5, engine block 8, valve seat contact surface 9, valve guide 10, duct port 12 and spring 13. These and other engine parts may be conventional.

Additionally, in the poppet valve in accordance with the invention, the contact area is increased. By increasing the contact area, the inventor realizes that this should prevent loss of compression, especially on high revolutions per minute, and increase dependability and durability.

Another way to consider the invention is that the peripheral edge section of the valve stem1 includes a bowl or hemispherical edge contoured to avoid turbulence as air flows over the peripheral edge section. The hemispherical edge is the shape when viewed in a cross-sectional plane extending through a center of the valve stem 1. The outer edge of a cross-sectional view extending entirely through the valve stem 1 and through its center would have at the extreme location, the shape of a hemisphere protruding outward (the valve seat having the complementary shape.

Disclosed above are therefore poppet valves that allow for increased filling of the cylinder, distribution of the fuel-air mixture within the combustion chamber in a uniform manner, and faster and better removal of combustion products. Individually or in any combination, these advantages improve the combustion process and reduce back pressure on the piston, resulting in increase efficiency and reduced pollution. Moreover, poppet valves in accordance with the invention overcome many of the limitations of conventional poppet valves The foregoing description and illustrations are representative only and do not imply any limitation on the relative orientation of the engine in accordance with the invention during use. Rather, the illustrations and accompanying description are provided to explain the invention and the relationship between the components thereof. Moreover, features of the prior art references identified above may be incorporated into the application, such as those characteristics relating to the materials used in the poppet valve or its manner of formation. These modifications are considered to be part of the disclosed invention.

Finally, while particular embodiments of the invention have been shown and described, it will be obvious to those skilled in the art that changes and modifications may be made without departing from the invention in its broader aspects, and, therefore, the aim in the appended claims is to cover all such changes and modifications as fall within the true spirit and scope of the invention.

The invention claimed is:

1. An internal combustion piston engine, comprising:
   a cylinder head partly defining a duct and a combustion chamber; and
   a poppet valve movably arranged in said cylinder head between a position allowing fluid flow between said combustion chamber and said duct and a position preventing fluid flow between said combustion chamber and said duct, said poppet valve having a stem, a valve head having a lower surface facing said combustion chamber and an upper surface opposite said lower surface and including a portion adjacent said stem, and a peripheral edge section that extends from said upper surface of said valve head to said lower surface of said valve head, said peripheral edge section containing an arcuate contact surface that extends from said upper surface of said valve head to said lower surface of said valve head and without any straight edges between said upper surface of said valve head and said lower surface of said valve head.

2. The engine of claim 1, wherein said valve head does not include sharp elements which is an element formed between two straight or flat portions that has an obtuse angle.

3. The engine of claim 1, wherein said peripheral edge section does not include any planar surface.

4. The engine of claim 1, wherein said peripheral edge section has a hemispherical shape between said upper surface of said valve head and said lower surface of said valve head when viewed in a plane that extends through a center of said valve head and through said peripheral edge section.

5. The engine of claim 1, wherein said peripheral edge section has a common cross-sectional shape around the entire circumference of said valve head.

6. The engine of claim 1, wherein said peripheral edge section is curved entirely from said upper surface of said valve head to said lower surface of said valve head.

7. The engine of claim 1, wherein said cylinder head has a valve seat at an end of said duct adjacent said combustion chamber and that has an arcuate contact surface that only partly matches said arcuate contact surface of said peripheral edge section, said valve head being movable into a position against said valve seat in which said arcuate contact surface of said peripheral edge section is in contact with said arcuate contact surface of said valve seat at an upper region proximate said upper surface of said valve head and said arcuate contact surface of said peripheral edge section is spaced apart from said arcuate contact surface of said valve seat at a lower region proximate said lower surface of said valve head, said arcuate contact surface of said valve seat being exposed at the lower region proximate said lower surface of said valve head to said combustion chamber.

8. The engine of claim 7, wherein said valve seat does not include sharp elements which is an element formed between two straight or flat portions that has an obtuse angle.

9. The engine of claim 1, wherein said duct does not have sharp edges thereby providing a smooth operative flow of fluid through said duct.

10. An internal combustion piston engine, comprising:
a cylinder head partly defining a duct and a combustion chamber, said cylinder head including a valve seat at an end of said duct adjacent said combustion chamber; and
a poppet valve movably arranged in said cylinder head between a position allowing fluid flow between said combustion chamber and said duct and a position preventing fluid flow between said combustion chamber and said duct, said poppet valve having a stem, a valve head having a lower surface facing said combustion chamber and an upper surface including a portion adjacent said stem, and a peripheral edge section that extends from said upper surface of said valve head to said lower surface of said valve head,
wherein said valve head does not include sharp elements which is an element formed between two straight or flat portions that has an obtuse angle,
wherein said peripheral edge section contains an arcuate contact surface without any straight edges between said upper surface of said valve head and said lower surface of said valve head, is curved entirely from said upper surface of said valve head to said lower surface of said valve head, and has a common cross-sectional shape around the entire circumference of said valve head, and
wherein said valve seat of said cylinder head has an arcuate contact surface that only partly matches said arcuate contact surface of said peripheral edge section, said valve head being movable into a position against said valve seat in which said arcuate contact surface of said peripheral edge section is in contact with said arcuate contact surface of said valve seat at an upper region proximate said upper surface of said valve head and said arcuate contact surface of said peripheral edge section is spaced apart from said arcuate contact surface of said valve seat at a lower region proximate said lower surface of said valve head, said arcuate contact surface of said valve seat being exposed at the lower region proximate said lower surface of said valve head to said combustion chamber.

11. The engine of claim 10, wherein said peripheral edge section does not include any planar surface.

12. The engine of claim 10, wherein said peripheral edge section has a hemispherical shape between said upper surface of said valve head and said lower surface of said valve head when viewed in a plane that extends through a center of said valve head and through said peripheral edge section.

13. The engine of claim 10, wherein said valve seat does not include sharp elements which is an element formed between two straight or flat portions that has an obtuse angle.

14. The engine of claim 10, wherein said duct does not have sharp edges thereby providing a smooth operative flow of fluid through said duct.

15. The engine of claim 10, wherein said peripheral edge section does not include any planar surface and has a hemispherical shape between said upper surface of said valve head and said lower surface of said valve head when viewed in a plane that extends through a center of said valve head and through said peripheral edge section.

16. The engine of claim 10, wherein said valve seat does not include sharp elements which is an element formed between two straight or flat portions that has an obtuse angle and said duct does not have sharp edges thereby providing a smooth operative flow of fluid through said duct.

17. An internal combustion piston engine, comprising:
a cylinder head partly defining a duct and a combustion chamber; and
a poppet valve movably arranged in said cylinder head between a position allowing fluid flow between said combustion chamber and said duct and a position preventing fluid flow between said combustion chamber and said duct, said poppet valve having a stem, a valve head having a lower surface facing said combustion chamber and an upper surface opposite said lower surface and including a portion adjacent said stem, and a peripheral edge section that extends from said upper surface of said valve head to said lower surface of said valve head,
said peripheral edge section having a surface with a hemispherical shape between said upper surface of said valve head and said lower surface of said valve head when viewed in a plane that extends through a center of said valve head and through said peripheral edge section.

18. The engine of claim 17, wherein said valve head does not include sharp elements which is an element formed between two straight or flat portions that has an obtuse angle.

19. The engine of claim 17, wherein said cylinder head has a valve seat at an end of said duct adjacent said combustion chamber and that has an arcuate contact surface that only partly matches said hemispherical shape of said surface of said peripheral edge section, said valve head being movable into a position against said valve seat in which said surface of said peripheral edge section having a hemispherical shape is in contact with said arcuate contact surface of said valve seat at an upper region proximate said upper surface of said valve head and said surface of said peripheral edge section having a hemispherical shape is spaced apart from said arcuate contact surface of said valve seat at a lower region proximate said lower surface of said valve head, said arcuate contact surface of said valve seat being exposed at the lower region proximate said lower surface of said valve head to said combustion chamber.

20. The engine of claim 19, wherein said valve seat does not include sharp elements which is an element formed between two straight or flat portions that has an obtuse angle.

* * * * *